US006880218B2

(12) United States Patent
Christopher

(10) Patent No.: US 6,880,218 B2
(45) Date of Patent: Apr. 19, 2005

(54) ROTOR REMOVAL TOOL AND METHOD

(76) Inventor: Mark J. Christopher, 11 Yorktown Dr., Shamong, NJ (US) 08088

( * ) Notice: Subject to any disclaimer, the term of this patent is extended or adjusted under 35 U.S.C. 154(b) by 0 days.

(21) Appl. No.: 10/352,160

(22) Filed: Jan. 28, 2003

(65) Prior Publication Data

US 2004/0143949 A1 Jul. 29, 2004

(51) Int. Cl.[7] ........ B23P 19/04

(52) U.S. Cl. ........ 29/239; 29/426.5; 29/802; 29/256; 29/266

(58) Field of Search ........ 29/239, 256, 266, 29/278, 894.321, 402.03, 426.5, 233, 258, 261, 523, 244, 277, 894, 802; 254/105, 38, 119; 405/184, 154, 42

(56) References Cited

U.S. PATENT DOCUMENTS

| | | | | | |
|---|---|---|---|---|---|
| 2,296,119 | A | * | 9/1942 | Ringrose | 29/262 |
| 3,689,978 | A | * | 9/1972 | Kelso | 29/259 |
| 4,771,528 | A | * | 9/1988 | Stromberg | 29/259 |
| 4,908,925 | A | | 3/1990 | Johnson | 29/260 |
| 4,965,921 | A | * | 10/1990 | Priest | 29/254 |
| 6,012,211 | A | | 1/2000 | Ochoa et al. | 29/426.5 |
| 6,192,566 | B1 | * | 2/2001 | Dunum | 29/239 |
| 6,327,769 | B1 | * | 12/2001 | Strickland | 29/426.6 |
| 6,581,265 | B2 | * | 6/2003 | Sawaya | 29/426.5 |
| 2002/0124376 | A1 | | 9/2002 | Pool et al. | 29/426.5 |

OTHER PUBLICATIONS

Chilton's Repair Manual printed from www.cybrrpartspro-.com on Dec. 11, 2002.

* cited by examiner

*Primary Examiner*—David P. Bryant
*Assistant Examiner*—Stephen Kenny
(74) *Attorney, Agent, or Firm*—Fitzpatrick, Cella, Harper & Scinto

(57) ABSTRACT

A tool for, and method of, removing a first component, such as a disc brake rotor, from an assembly, such as a disc brake assembly. The tool includes an elongated bar and a pressing device. The elongated bar has a pressing surface for pressing against the first component, and a backing surface opposite the pressing surface. The pressing device is connectable to the backing surface of the elongated bar. The pressing device is adjustable to engage a second component that is fixed to the assembly, in order to apply a force between the first component and the second component, to thereby remove the first component from the assembly.

28 Claims, 7 Drawing Sheets

ROTOR REMOVAL TOOL AND METHOD

FIELD OF THE INVENTION

The present invention relates generally to a tool used to remove a component from an assembly by providing a force between the component to be removed and the assembly. The present invention also relates to a method of removing a component from an assembly using a tool.

BACKGROUND OF THE INVENTION

Prior to the present invention, there was no suitable way to remove the disc brake rotor from the hub of some vehicles.

An exploded view of a front disc brake assembly of a conventional front- or four-wheel drive vehicle is shown in FIG. 1. The brake assembly generally comprises a steering knuckle 4, which is pivotally attached to the vehicle suspension to allow a vehicle wheel (not shown) to turn. An axle shaft or drive shaft 2 extends through an opening in the center of the steering knuckle 4, such that a distal end 20 of the drive shaft projects outwardly from the steering knuckle 4. The distal end 20 of the axle shaft 2 has splines formed in its outer periphery. A wheel hub 10 is provided with splines about its inner periphery sized to engage the splines of the axle shaft 2. A wheel bearing assembly 8 is interposed between the wheel hub 10 and the axle shaft 2, within the steering knuckle 4, to align and support the vehicle wheel for rotation relative to the steering knuckle 4. Wheel studs 12 are press-fitted into a plurality of holes formed in the outer periphery of the hub 10. A disc brake rotor 14 is then fitted over the wheel hub 10 by aligning a plurality of corresponding holes formed in the rotor 14 with the wheel studs 12 press-fitted in the wheel hub 10. A brake caliper (not shown) is attached via a caliper mounting bracket (also not shown) to the steering knuckle 4 at caliper mounting bosses 18. The brake caliper supports a pair of brake pads (also not shown) on either side of the rotor 14. In operation, the brake pads clamp the rotor 14 therebetween in order to stop the vehicle when an operator depresses the vehicle brake pedal.

Some vehicles are manufactured with a very small tolerance between the inner diameter of the rotor 14 and the outer diameter of the hub 10. Therefore, it is sometimes difficult to remove the rotor 14 from the hub 10 in order to service the rotor 14. This problem is especially pronounced when the vehicle is older and the brake assembly components have a build-up of dirt and/or corrosion.

The rotor 14 may also be difficult to remove from the hub 10 when the vehicle has been recently driven, due to thermal expansion of the hub 10. During braking, heat is generated due to both friction between the brake pads and the rotor 14 and friction in the wheel bearings, thereby heating the whole brake assembly (including both the rotor 14 and hub 10) and causing thermal expansion of the parts of the assembly. Because the rotor 14 has a large surface area and is designed to dissipate heat quickly, the rotor 14 will cool much faster than the hub 10. As the rotor 14 cools it will contract onto the hub 10 creating an interference fit between the hub 10 and rotor 14.

Mechanics have developed a technique of removing rotors that have become stuck on the vehicle hub due to dirt, corrosion, and/or thermal contraction, by simply prying them off the hub using a pry bar. However, this technique is likely to damage various components of the wheel assembly, and is, therefore, unsatisfactory.

As another means of removal, brake rotors on some front-wheel drive vehicles include a pair of threaded removal holes (in addition to the holes to accommodate the wheel lugs) formed in the central region of the rotor. To remove the brake rotor, bolts are threaded into the removal holes and screwed in. As the bolts begin to protrude through the rotor, they contact the hub 10 and press the rotor away from, and off of, the hub.

However, brake rotors on most vehicles are not provided with these threaded removal holes. There is, therefore, a need in the art for an improved tool for, and method of, quickly and safely removing a brake rotor from a hub of a vehicle, without damaging any of the brake assembly components.

SUMMARY OF THE INVENTION

The present invention provides an improved tool for, and method of, removing a component from an assembly, that is fast, safe, and reduces the likelihood of damaging the component during removal. The tool and method of the present invention are especially useful for removing a brake rotor from a hub of a vehicle.

In one aspect, the present invention relates to a tool for removing a first component from an assembly, the tool comprising an elongated bar and a pressing device. The elongated bar has a pressing surface for pressing against the first component, and a backing surface opposite the pressing surface. The pressing device is connectable to the backing surface of the elongated bar. Moreover, the pressing device is adjustable to engage a second component that is fixed to the assembly, in order to apply a force between the first component and the second component, to thereby remove the first component from the assembly.

In another aspect, the present invention relates to a tool for removing a brake rotor from a disc brake assembly, the tool comprising an elongated bar and a pressing device. The elongated bar has a pressing surface for pressing against the brake rotor, and a backing surface opposite the pressing surface. The pressing device is connectable to the backing surface of the elongated bar. Furthermore, the pressing device is adjustable to engage a caliper mount of the disc brake assembly, in order to apply a force between the brake rotor and the caliper mount, to thereby remove the brake rotor from the brake assembly.

In yet another aspect, the present invention relates to a method of removing a first component of an assembly. The method comprises the steps of attaching a tool to a second component of the assembly, and adjusting the tool to apply a force between the first component and the second component, to thereby remove the first component from the assembly.

In still another aspect, the present invention relates to a method of removing a disc brake rotor. The method comprises the steps of removing a brake caliper from a vehicle caliper mount, attaching a tool to the vehicle caliper mount, and adjusting the tool to apply a force between the caliper mount and the brake rotor, to thereby remove the brake rotor.

These and other aspects, objects, and features of the present invention will become apparent from the following detailed description of the preferred embodiments, read in conjunction with, and with reference to, the accompanying drawings.

DETAILED DESCRIPTION OF THE PREFERRED EMBODIMENTS

Figure 2B:
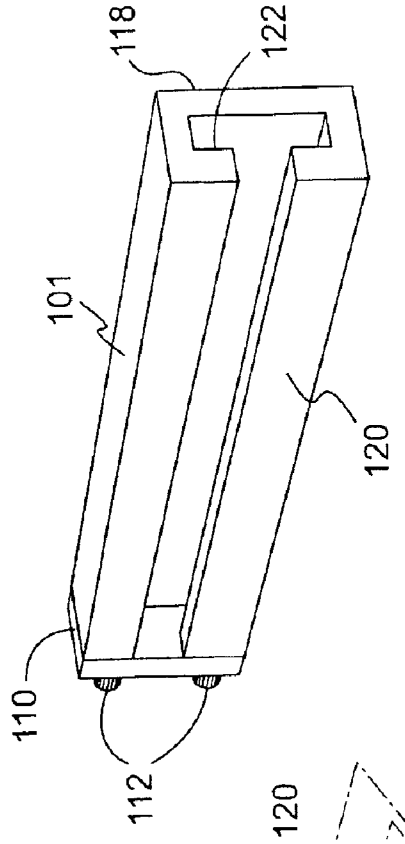
FIG. 2B is a perspective view of the elongated bar member of the tool of the present invention.
Figure 2A:
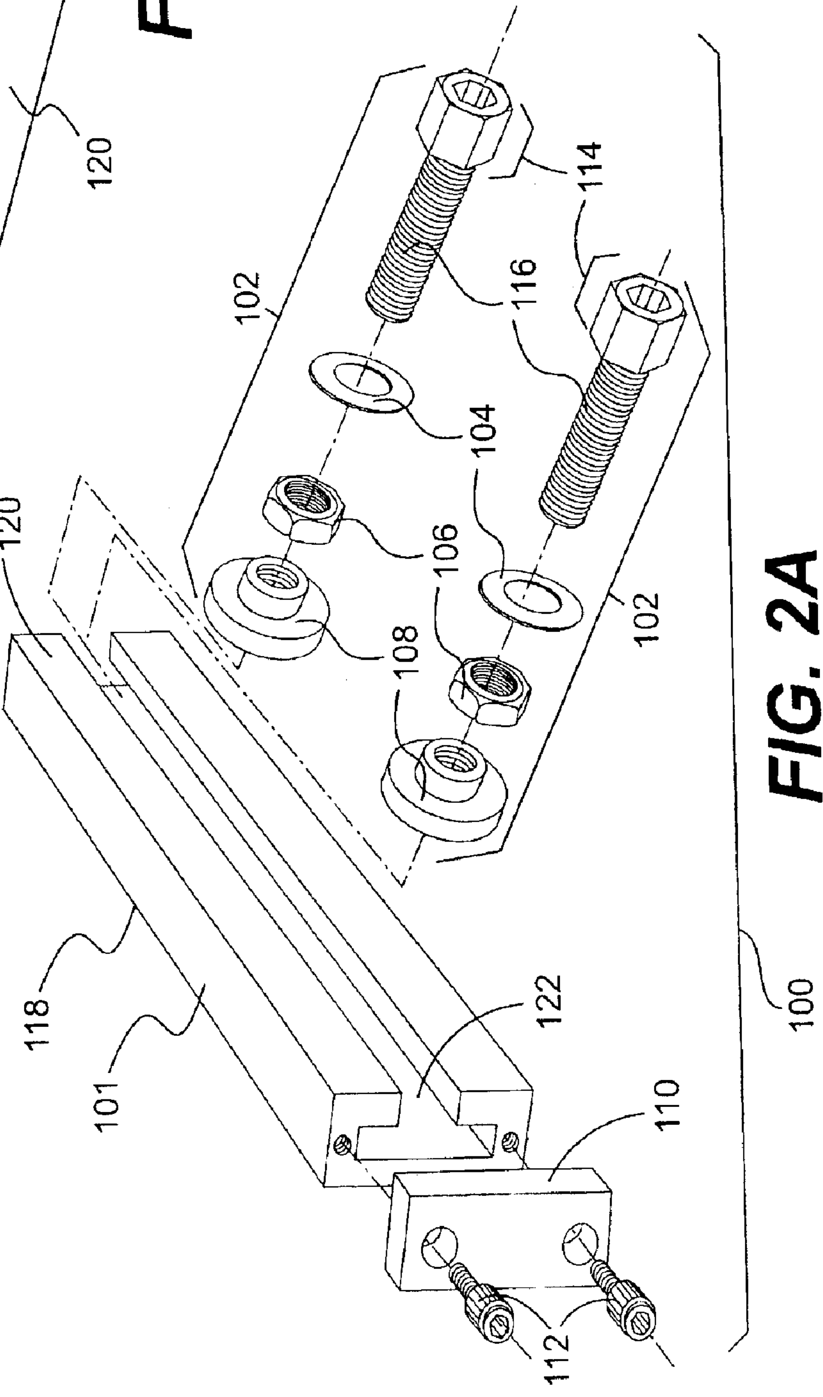
FIG. 2A is an exploded perspective view of the tool of the present invention.

In general, the present invention relates to a tool used to remove a component from an assembly by providing a force between the component to be removed and the assembly. As illustrated in FIGS. 2A and 2B, the tool 100 generally comprises an elongated bar 101 and a pressing device 102. In operation, the tool 100 is attached, via the pressing device 102, to the assembly. The pressing device 102 is then attached to the elongated bar 101, and adjusted to provide a pressing force between the assembly and a component to be removed. The elongated bar 101 abuts the component to be removed from the assembly and distributes the pressing force applied by the pressing device 102 over a larger area of the component that is being removed.

Figure 1:
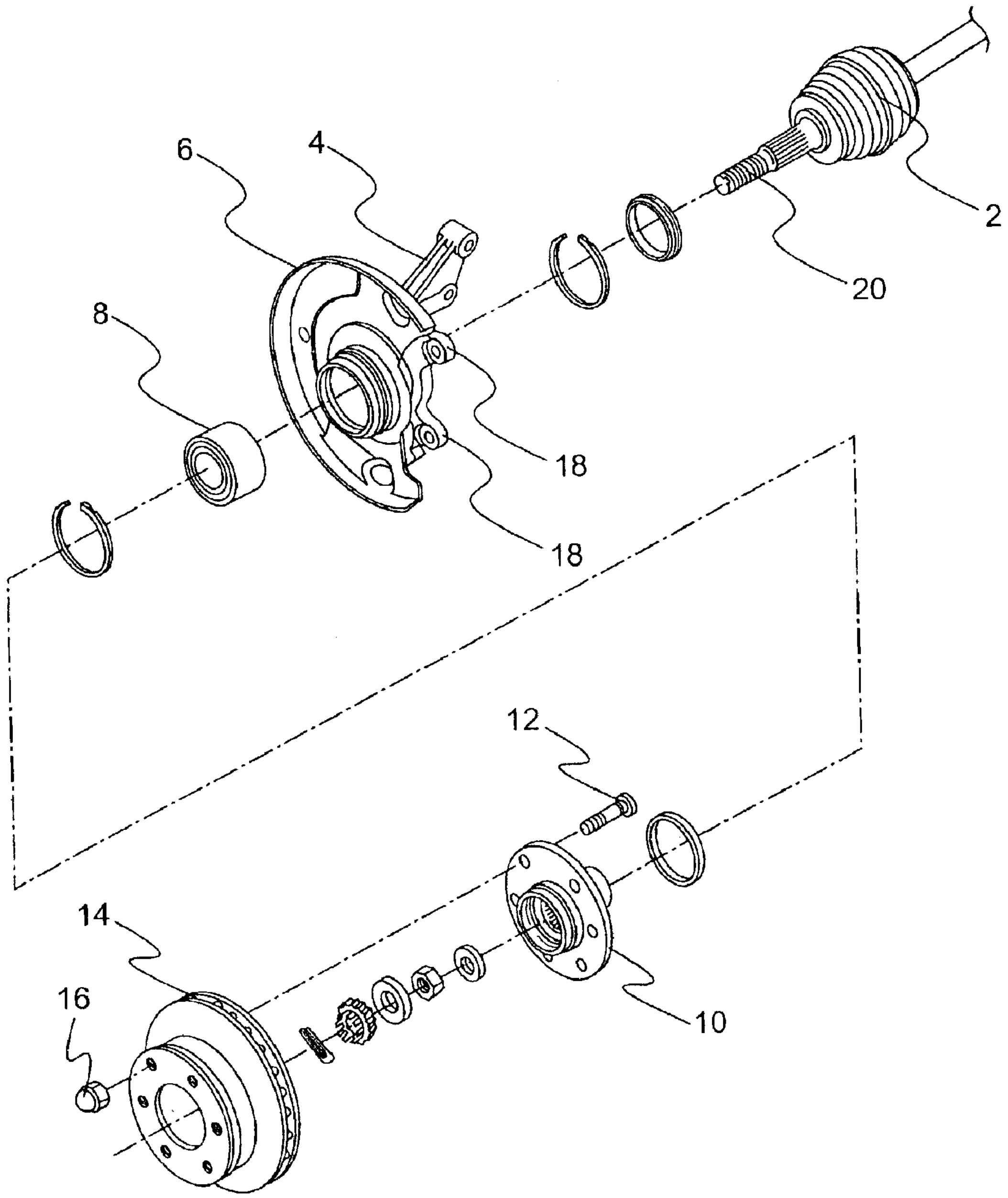
FIG. 1 is an exploded perspective view of a conventional front disc brake assembly of a front- or four-wheel drive vehicle.

The tool may be adapted to remove different components from various different assemblies. However, one particular application to which the tool is especially well suited, is the removal of a disc brake rotor from a brake assembly of a front- or four-wheel drive vehicle (such as the conventional brake assembly shown in FIG. 1). This preferred embodiment of the tool of the present invention is described in detail below with reference to FIGS. 2A and 2B. While the present invention is particularly well suited for use in removing disc brake rotors from brake assemblies, this use is merely illustrative of one of the many uses of the present invention. The tool may advantageously be adapted to remove a wide range of mechanical components from their respective assemblies, without departing from the spirit and scope of the claimed invention.

In this preferred embodiment of the tool 100, the elongated bar 101 comprises a rectangular bar having a pressing surface 118 for pressing against the brake rotor 14, and a backing surface 120 opposite the pressing surface 118. As best illustrated in FIG. 2B, a channel 122 having a T-shaped cross-section is provided in the backing surface 120 and extends between longitudinal ends of the elongated bar 101. Instead of a T-shaped cross-section, the channel may have any desired cross-sectional shape, so long as the opening of the channel in the backing surface 120 of the elongated bar 101 is narrower than the rest of the channel.

An end plate 110 is attached to the elongated bar 101 at a first longitudinal end thereof, preferably by a pair of connectors 112, such as allen screws, hex bolts, machine screws, rivets, other suitable connectors. Alternatively, the end plate 10 could be formed integrally with the elongated bar 101.

The elongated bar 101 is preferably made of steel, however, any suitable material having sufficient strength characteristics may also be used. Some other suitable materials include aluminum, iron, bronze, copper, titanium, plastics, polymers, carbon fiber, fiberglass, composites thereof, or the like. Further, while the elongated bar is disclosed in the preferred embodiment as being rectangular, the shape of the bar may be adapted to fit various different uses.

The pressing device 102, in the preferred embodiment, takes the form of a pair of screw jacks. The term screw jack is used herein to refer to any device that is capable of providing a compressive force by rotation of a threaded rod or screw relative to a threaded sleeve or nut. Each of the screw jacks 102 comprises a threaded rod 116, a drive head 114 fixedly attached to one end of the threaded rod 116, a cap 108 connected to the other end of the threaded rod 1 16, and an adjuster nut 106 threaded on the threaded rod 116 and located between the drive head 114 and the cap 108. Each screw jack 102 may further include a washer 104 positioned between the adjuster nut 106 and the drive head 114, although such is not critical for the function of the invention.

The drive heads 114 may be formed integrally with the threaded rods 116, as in the case of a standard hex bolt or allen bolt. Alternatively, the drive heads 114 may be separate elements, fixedly attached to one end of the threaded rods, such as a pair of jammed nuts (i.e., locked together by an interference fit), a cap or blind nut, a nut welded on the threaded rod, or the like. The adjuster nuts 106 may be any suitable nut or threaded sleeve corresponding in size and thread to the threaded rods 116.

The caps 108 of the screw jacks are in the shape of stepped circular discs, each having a small side and a large side. The caps 108 have an outer profile corresponding in shape to the cross-section of the channel 122. Each cap 108 has a blind threaded bore formed in the small side thereof for connection with the threaded rods 116. Alternatively, the caps 108 may be connected to the threaded rods 116 by a snap connection, a rivet, plastic deformation, or the like. In these alternative connection arrangements, the caps 108 could be infinitely rotatable relative to the threaded rods 116. While the shape of the caps 108 is not crucial, it is preferable that they are circular (as viewed from an axial end thereof) so that they can rotate within a the channel 122 of the elongated bar 101. However, the caps 108 could also be square or rectangular, for example, especially if the caps 108 are rotatably connected to the threaded rods 116 by one of the alternative connection arrangements.

While the pressing device 102 of the preferred embodiment is described as comprising a pair of screw jacks, any suitable device that is capable of providing a pressing force may instead be used. Other suitable devices that could be used include ratcheting devices, cam operated devices, hydraulic devices, or the like. Moreover, while a pair of screw jacks are disclosed, any number of suitable pressing devices may be used, including a single pressing device.

The installation and use of the tool 100 on a disc brake assembly of a vehicle will be described with reference to FIGS. 3–7.

Figure 3:
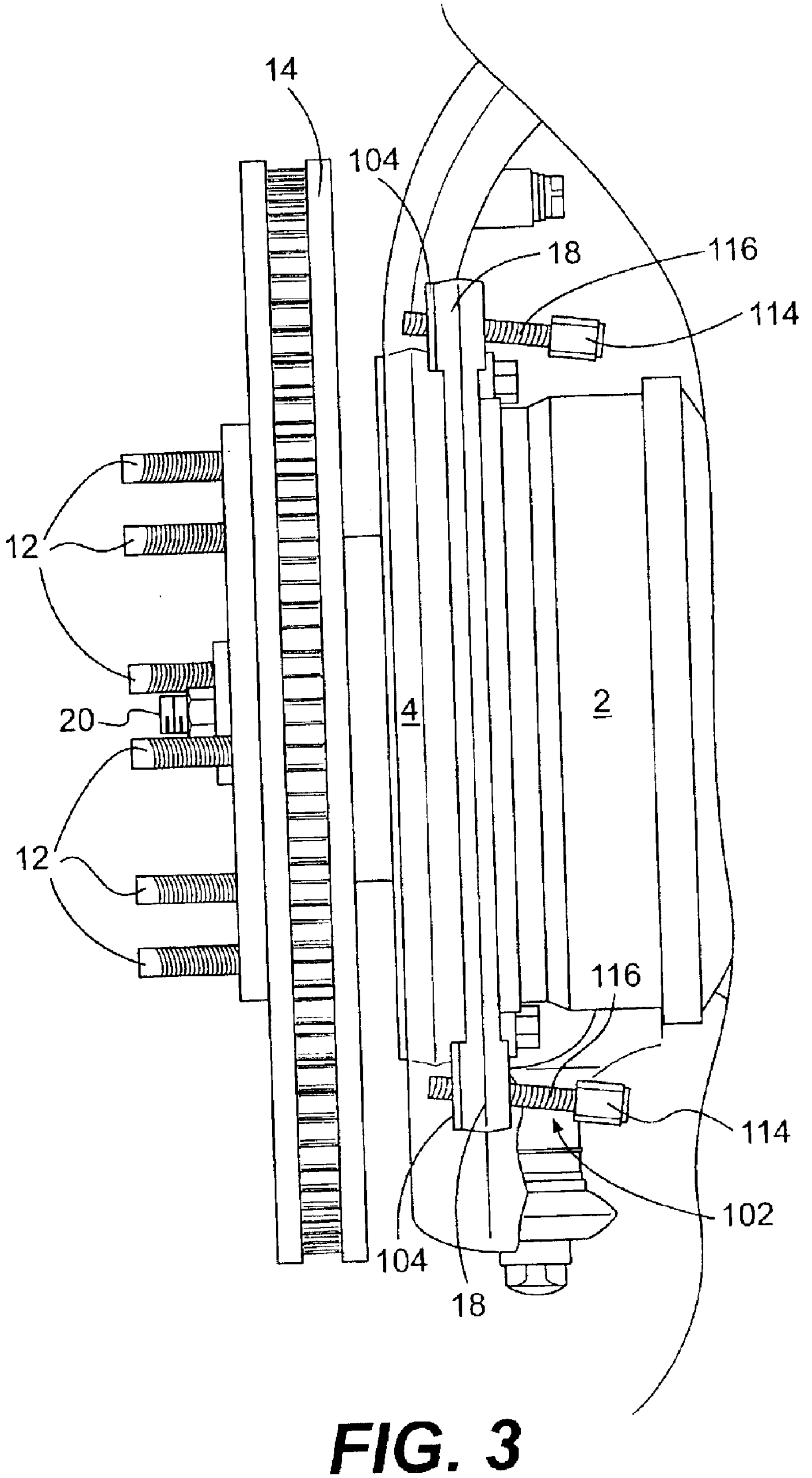
FIG. 3 is a front view showing a front disc brake assembly of a vehicle with the tool of the present invention in a first, partially installed, condition.

FIG. 3 shows a front disc brake assembly of a vehicle, with the vehicle's wheel and brake caliper already removed. The screw jacks 102 of the tool 100 are positioned on the caliper mount of the vehicle brake assembly by inserting the threaded rods 116 through holes found in a pair of caliper mounting bosses 18. It should be noted that not all vehicles have the sort of caliper mounts shown in the drawing figures.

However, one of ordinary skill in the art will recognize that the tool of the present invention could be easily adapted for use on vehicles having other sorts of brake caliper mounting configurations.

Figure 4:
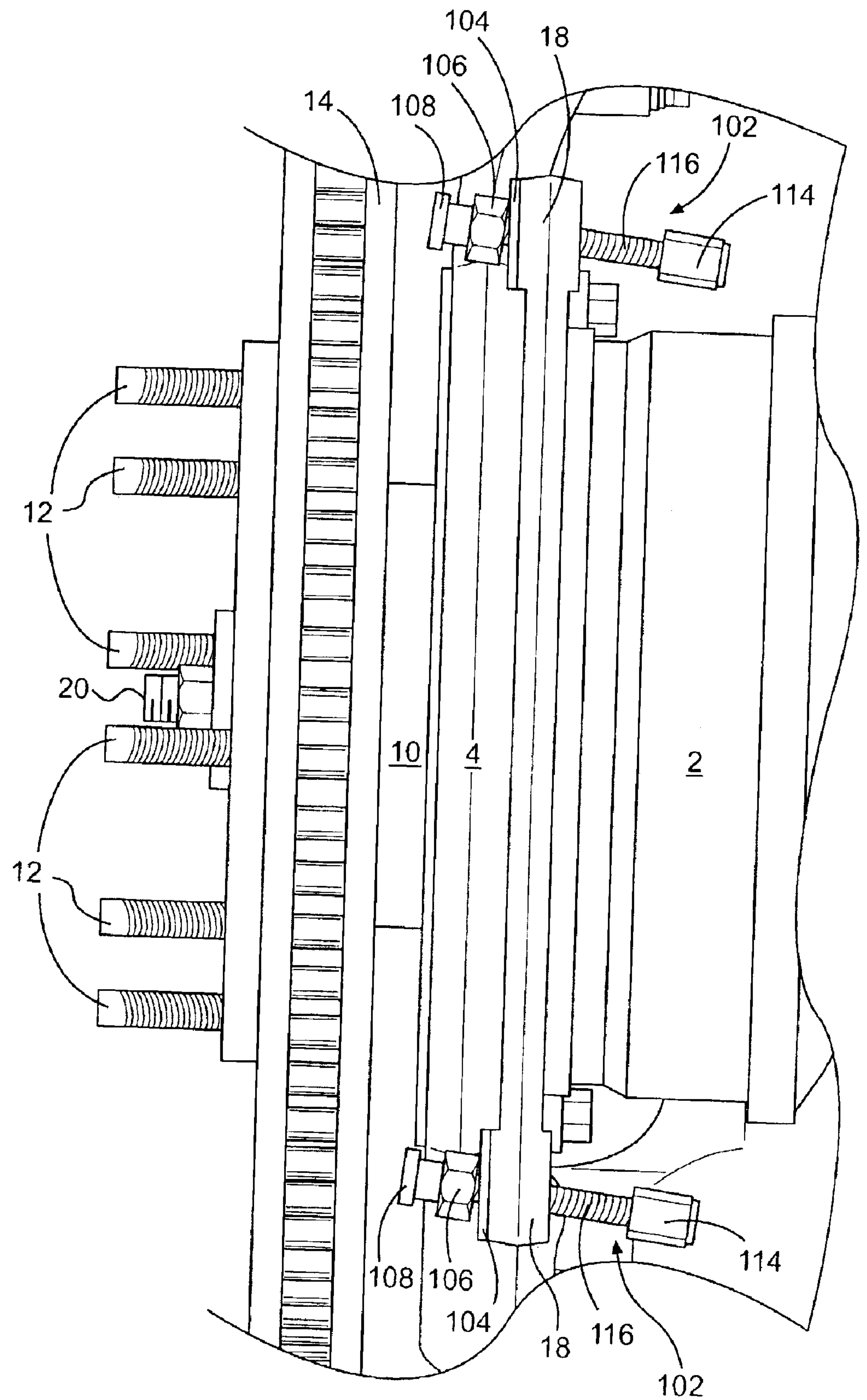
FIG. 4 is a front view showing a front disc brake assembly of a vehicle with the tool of the present invention in a second, mostly installed, position.

Next, as shown in FIG. 4, the washers 104 are positioned on the threaded rods 116 adjacent to the respective mounting bosses 18. The adjuster nuts 106 are then threaded onto the threaded rods 116, and caps 108 are attached to the ends of the threaded rods 116. At this point, the screw jacks are loosely connected to the mounting bosses 18 of the caliper mount.

Figure 5:
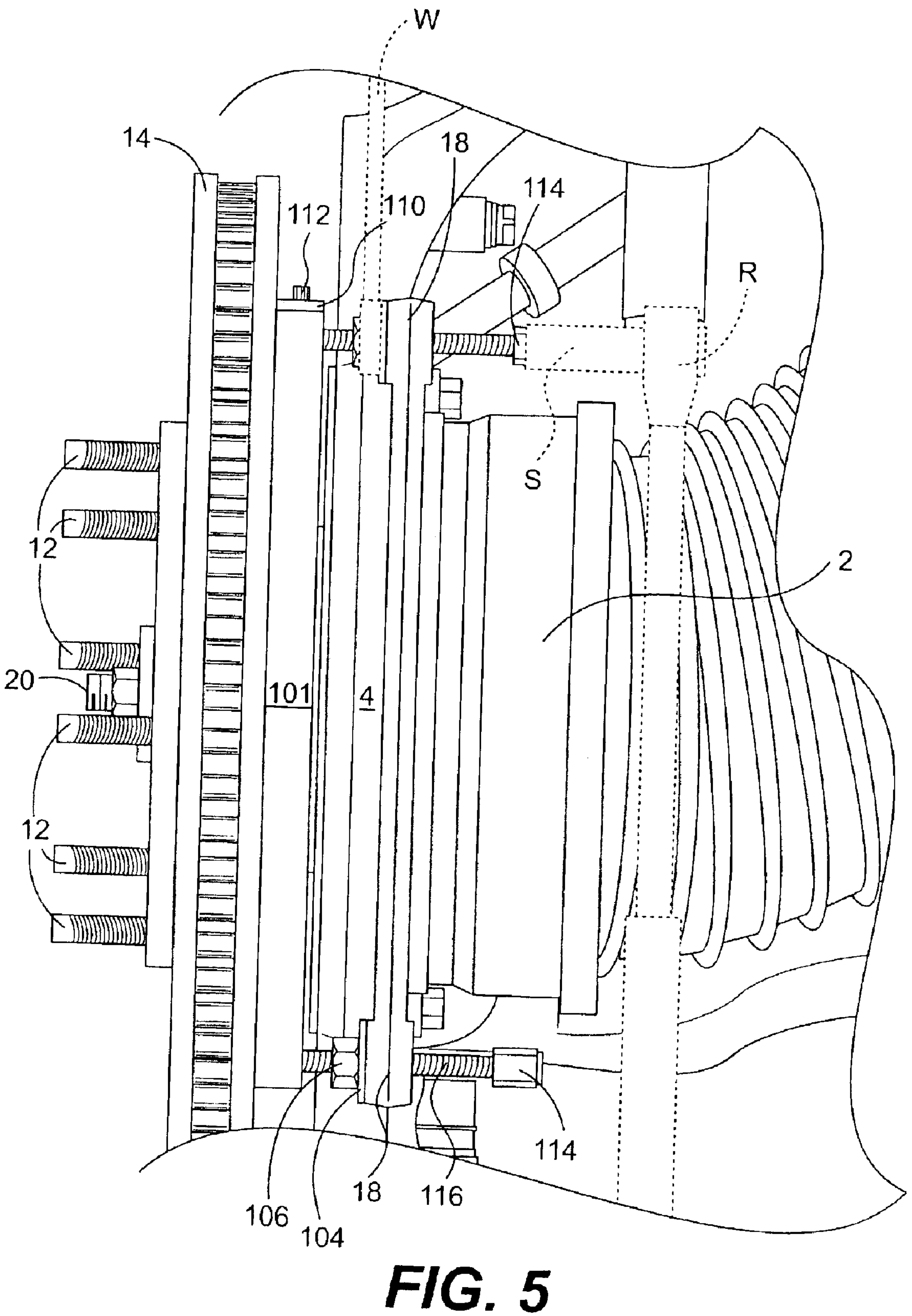
FIG. 5 is a front view showing a front disc brake assembly of a vehicle with the tool of the present invention in a third, fully installed, position.

The elongated bar 101 is then attached to the to the screw jacks 102 by sliding the channel 122 down over the caps 108 until the upper cap 108 rests against the end plate 110 of the elongated bar as shown in FIG. 5. Since the profile of the caps 108 matches that of the channel 122 formed in the elongated bar 101, the caps 108 are slidably retained within the channel 122. In this manner, the tool 100 is effectively held in place by the caliper mount, freeing the operator's hands for adjustment of the tool 100. The sliding engagement of the screw jacks 102 with the elongated bar 101 allows for extensive adjustment of the tool 100 to fit various caliper mounts having different sizes and arrangements.

Once the tool 100 is in place on the vehicle caliper mount, the operator adjusts the tool as shown in FIG. 5. Specifically, the operator holds the adjuster nuts 106 stationary with, for example, a wrench W (shown in phantom), while rotating the threaded rods 116 via drive heads 114 with, for example, a socket S (shown in phantom) turned by a ratcheting socket wrench R (shown in phantom). This rotation of the threaded rods 116 relative to the adjuster nuts 106 causes the elongated bar 101 to translate in the axial direction of the threaded rods 116 into contact with the brake rotor 14. As the adjustment of the tool 100 continues, screw jacks 102 impart a pressing force between the caliper mounting bosses 18 and the brake rotor 14 until the rotor 14 becomes dislodged from the hub 10. The large pressing surface 118 of the elongated bar 101 effectively distributes the pressing force generated by the screw jacks 102 evenly over a large area of the rotor's surface.

Figure 6:
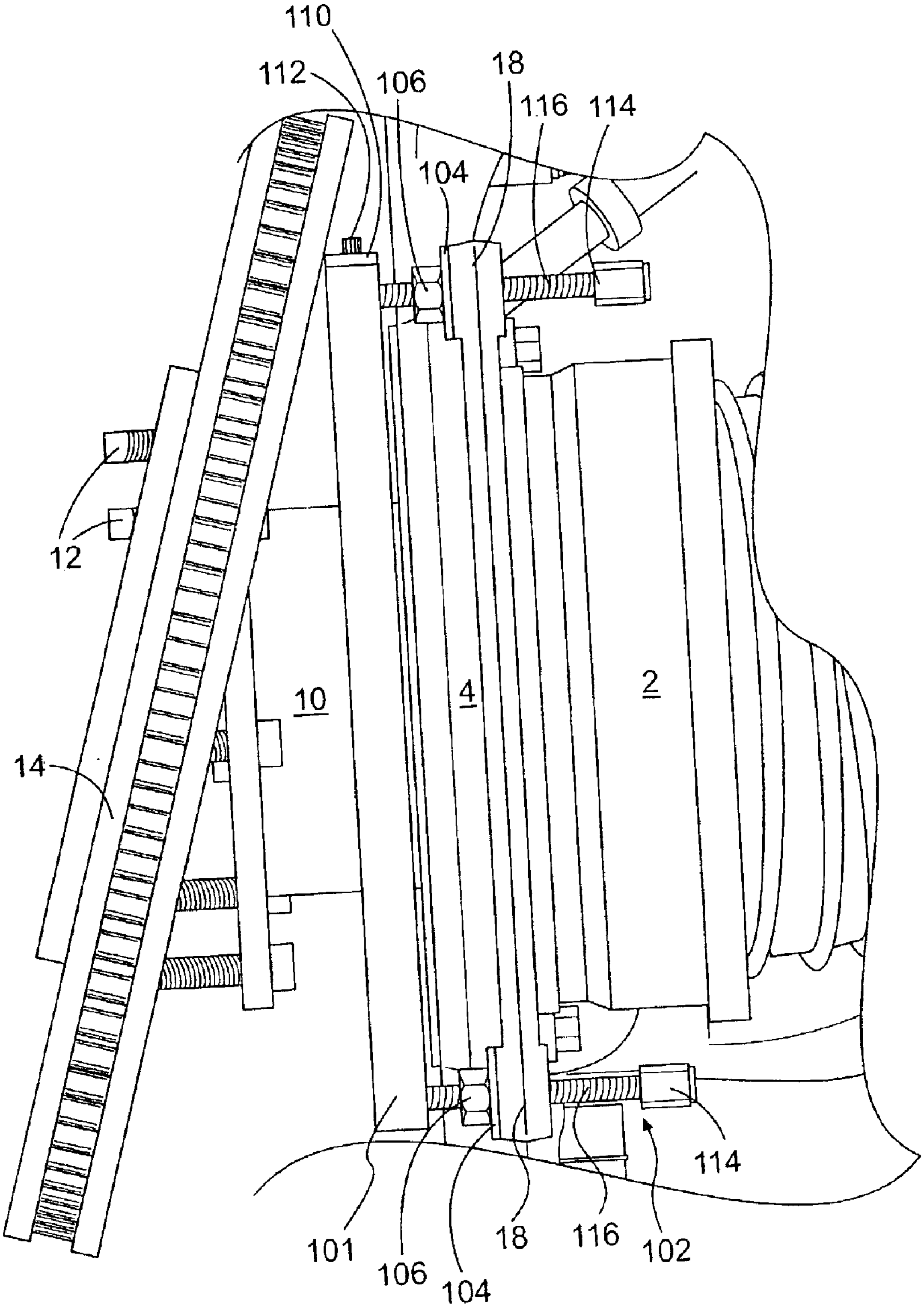
FIG. 6 is a front view showing a front disc brake assembly of a vehicle with the rotor partially removed using the tool of the present invention.
Figure 7:
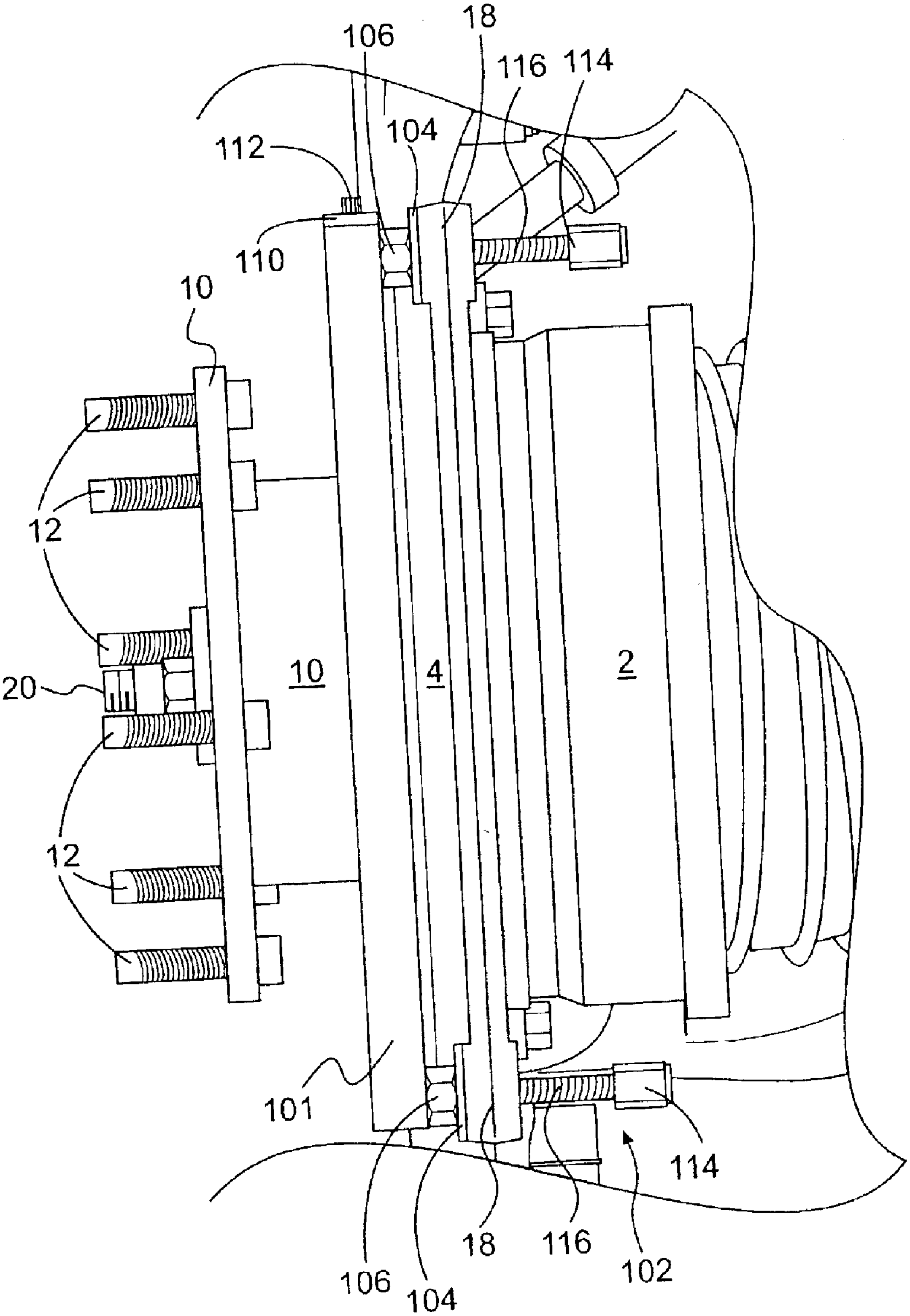
FIG. 7 is a front view showing a front disc brake assembly of a vehicle with the rotor fully removed using the tool of the present invention.

FIG. 6, shows the rotor 14 in a state of being dislodged from the hub 10 and resting on the wheel studs 12. At this point the operator can easily grasp and remove the rotor 14 from the brake assembly in order to service the rotor 14. FIG. 7 illustrates the brake assembly with the rotor 14 completely removed to expose the hub 10 and wheel studs 12. In FIG. 7, the tool 100 is shown adjusted back toward the caliper mounting bosses 18.

Based on the foregoing description, it is apparent that the tool of the present invention provides an improved tool for, and method of, removing a brake rotor from a hub that is fast, safe, and reduces the likelihood of damaging the rotor during removal.

Although specific embodiments of the present invention have been described above in detail, it will be understood that this description is merely for purposes of illustration. Various modifications of the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

I claim:

1. A tool for removing a first component from an assembly, said tool comprising:

an elongated bar having a pressing surface, fixed relative to said elongated bar, for pressing against the first component, and a backing surface, fixed relative to said elongated bar, opposite said pressing surface; and a pressing device connectable to the backing surface of said elongated bar, wherein said pressing device is adjustable to engage a second component that is fixed to the assembly, and a portion of said pressing device between the first component and the second component lengthens in order to apply a force between the first component and the second component, to thereby remove the first component from the assembly.

2. A tool as set forth in claim 1, wherein said pressing device comprises a screw jack slidably connected to the backing surface of said elongated bar.

3. A tool as set forth in claim 2, wherein said screw jack comprises a threaded rod, a drive head fixedly attached to one end of said threaded rod, a cap connected to the other end of said threaded rod, and an adjuster nut threaded on said threaded rod and located between said drive head and said cap.

4. A tool as set forth in claim 2, wherein said pressing device further comprises a second screw jack connected to the backing surface of said elongated bar, both of said screw jacks being substantially the same.

5. A tool as set forth in claim 3, further comprising a channel formed in said backing surface of said elongated bar, extending between longitudinal ends of said elongated bar, wherein said cap is slidable within said channel.

6. A tool as set forth in claim 5, wherein said channel has a T-shaped cross-section, and wherein said cap has an outer profile corresponding in shape to the cross-section of said channel, such that said cap is slidably retained within said channel.

7. A tool as set forth in claim 5, further comprising an end plate attached to a first longitudinal end of said elongated bar to prevent said cap of said screw jack from sliding past said first longitudinal end of said elongated bar.

8. A tool for removing a brake rotor from a disc brake assembly, said tool comprising:

an elongated bar having a pressing surface, fixed relative to said elongated bar, for pressing against the brake rotor, and a backing surface, fixed relative to said elongated bar, opposite said pressing surface; and a pressing device connectable to said backing surface of said elongated bar, wherein said pressing device is adjustable to engage a caliper mount of the disc brake assembly, in order to apply a force between the brake rotor and the caliper mount, to thereby remove the brake rotor from the brake assembly.

9. A tool as set forth in claim 8, wherein said pressing device comprises a screw jack slidably connected to the backing surface of said elongated bar.

10. A tool as set forth in claim 9, wherein said screw jack comprises a threaded rod, a drive head fixedly attached to one end of said threaded rod, a cap connected to the other end of said threaded rod, and an adjuster nut threaded on said threaded rod and located between said drive head and said cap.

11. A tool as set forth in claim 9, wherein said pressing device further comprises a second screw jack connected to the backing surface of said elongated bar, both of said screw jacks being substantially the same.

12. A tool as set forth in claim 10, further comprising a channel formed in said backing surface of said elongated bar, extending between longitudinal ends of said elongated bar, wherein said cap is slidable within said channel.

13. A tool as set forth in claim 12, wherein said channel has a T-shaped cross-section, and wherein said cap has an outer profile corresponding in shape to the cross-section of said channel, such that said cap is slidably retained within said channel.

14. A tool as set forth in claim 12, further comprising an end plate attached to a first longitudinal end of said elongated bar to prevent said cap from sliding past said first longitudinal end of said elongated bar.

15. A method of removing a first component of an assembly, comprising the steps of:

attaching a tool to a second component that is fixed to the assembly, the tool comprising an elongated bar having a pressing surface, fixed relative to the elongated bar, for pressing against the first component, and a backing surface, fixed relative to the elongated bar, opposite the pressing surface, and a pressing device connectable to the backing surface of the elongated bar; and adjusting the pressing device of the tool to engage the second component, such that a portion of said pressing device between the first component and the second component lengthens in order to apply a force between the first component and the second component, to thereby remove the first component from the assembly.

16. A method as set forth in claim 15, wherein said attaching step comprises the steps of:

inserting a threaded rod comprising the pressing device of the tool through the second component;

threading an adjuster nut onto the threaded rod;

connecting a cap to an end of the threaded rod; and sliding the elongated bar over the cap of the threaded rod.

17. A method as set forth in claim 16, wherein said adjusting step comprises the steps of:

holding the adjuster nut stationary; and rotating the threaded rod, such that the cap and the elongated bar are driven into contact with the first component to remove the first component.

18. A method as set forth in claim 15, wherein said attaching step comprises the steps of:

inserting a pair of threaded rods comprising the pressing device of the tool through holes in the second component;

threading an adjuster nut onto each of the threaded rods;

connecting a cap to an end of each of the threaded rods; and sliding the elongated bar over the caps of the threaded rods, and wherein said adjusting step comprises the steps of:

holding the adjuster nuts stationary; and rotating the threaded rods, such that the caps and the elongated bar are driven into contact with the first component to remove the first component.

19. A method of removing a disc brake rotor, comprising the steps of:

removing a brake caliper from a vehicle caliper mount;

attaching a tool to the vehicle caliper mount, the tool comprising an elongated bar having a pressing surface, fixed relative to the elongated bar, for pressing against the brake rotor, and a backing surface, fixed relative to the elongated bar, opposite the pressing surface, and a pressing device connectable to the backing surface of the elongated bar; and adjusting the tool to apply a force between the caliper mount and the brake rotor, to thereby remove the brake rotor.

20. A method as set forth in claim 19, wherein said attaching step comprises the steps of:

inserting a threaded rod comprising the pressing device of the tool through a hole in the vehicle caliper mount;

threading an adjuster nut onto the threaded rod;

connecting a cap to an end of the threaded rod; and sliding the elongated bar over the cap.

21. A method as set forth in claim 20, wherein said adjusting step comprises the steps of:

holding the adjuster nut stationary; and rotating the threaded rod, such that the cap and the elongated bar are driven into contact with the brake rotor to remove the brake rotor.

22. A method as set forth in claim 19, wherein said attaching step comprises the steps of:

inserting a pair of threaded rods comprising the pressing device of the tool through holes in the vehicle caliper mount;

threading an adjuster nut onto each of the threaded rods;

connecting a cap to an end of each of the threaded rods; and sliding the elongated bar over the caps, and wherein said adjusting step comprises the steps of:

holding the adjuster nuts stationary, and rotating the threaded rods, such that the caps and the elongated bar are driven into contact with the brake rotor to remove the brake rotor.

23. A tool for removing a first component from an assembly, said tool comprising:

an elongated bar having a pressing surface for pressing against the first component, and a backing surface opposite said pressing surface with a channel formed therein and extending between longitudinal ends of said elongated bar; and a pressing device connectable to the backing surface of said elongated bar, said pressing device comprising a screw jack slidably connected to the backing surface of said elongated bar, wherein said screw jack comprises a threaded rod, a drive head fixedly attached to one end of said threaded rod, a cap connected to the other end of said threaded rod, and an adjuster nut threaded on said threaded rod and located between said drive head and said cap, and said cap is slidable within said channel of said elongated bar, wherein said pressing device is adjustable to engage a second component that is fixed to the assembly, in order to apply a force between the first component and the second component, to thereby remove the first component from the assembly.

24. A tool as set forth in claim 23, wherein said channel has a T-shaped cross-section, and wherein said cap has an outer profile corresponding in shape to the cross-section of said channel, such that said cap is slidably retained within said channel.

25. A tool as set forth in claim 23, further comprising an end plate attached to a first longitudinal end of said elongated bar to prevent said cap of said screw jack from sliding past said first longitudinal end of said elongated bar.

26. A tool for removing a brake rotor from a disc brake assembly, said tool comprising:

an elongated bar having a pressing surface for pressing against the brake rotor, and a backing surface opposite said pressing surface with a channel formed therein and extending between longitudinal ends of said elongated bar; and a pressing device connectable to said backing surface of said elongated bar, said pressing device comprising a screw jack slidably connected to the backing surface of said elongated bar, wherein said screw jack comprises a threaded rod, a drive head fixedly attached to one end of said threaded rod, a cap connected to the other end of said threaded rod, and an adjuster nut threaded on said threaded rod and located between said drive head and said cap, and said cap is slidable within said channel of said elongated bar, wherein said pressing device is adjustable to engage a caliper mount of the disc brake assembly, in order to apply a force between the brake rotor and the caliper mount, to thereby remove the brake rotor from the brake assembly.

27. A tool as set forth in claim 26, wherein said channel has a T-shaped cross-section, and wherein said cap has an outer profile corresponding in shape to the cross-section of said channel, such that said cap is slidably retained within said channel.

28. A tool as set forth in claim 26, further comprising an end plate attached to a first longitudinal end of said elongated bar to prevent said cap from sliding past said first longitudinal end of said elongated bar.

* * * * *